(12) United States Patent
Sheth et al.

(10) Patent No.: US 8,073,762 B2
(45) Date of Patent: *Dec. 6, 2011

(54) METHOD AND APPARATUS FOR AN ELECTRONIC MARKETPLACE FOR SERVICES HAVING A COLLABORATIVE WORKSPACE

(75) Inventors: Beerud D. Sheth, Sunnyvale, CA (US); Srinivas Anumolu, Sunnyvale, CA (US)

(73) Assignee: Elance, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/304,870

(22) Filed: Dec. 14, 2005

(65) Prior Publication Data

US 2006/0095366 A1   May 4, 2006

Related U.S. Application Data

(63) Continuation of application No. 09/648,408, filed on Aug. 24, 2000, now Pat. No. 7,069,242.

(60) Provisional application No. 60/150,611, filed on Aug. 24, 1999.

(51) Int. Cl.
     *G06Q 40/00* (2006.01)
(52) U.S. Cl. ......................................... 705/37
(58) Field of Classification Search .................. 705/7–9, 705/37, 80; 707/705–812; 715/751–753; 718/102

See application file for complete search history.

(56) References Cited

U.S. PATENT DOCUMENTS

| | | |
|---|---|---|
| 4,703,325 A | 10/1987 | Chamberlin et al. |
| 4,799,156 A | 1/1989 | Shavit et al. |
| 5,008,853 A | 4/1991 | Bly et al. |
| 5,548,506 A | 8/1996 | Srinivasan |
| 5,557,515 A | 9/1996 | Abbruzzese et al. |
| 5,592,620 A | 1/1997 | Chen et al. |
| 5,664,115 A | 9/1997 | Fraser |
| 5,715,402 A | 2/1998 | Popolo |

(Continued)

FOREIGN PATENT DOCUMENTS

EP   0952536 A1   10/1999

(Continued)

OTHER PUBLICATIONS

.ants.com web pages [online]. Ants.com [retrieved on Aug. 22, 2000]. Retrieved from the Internet: <URL: http://www.ants.com/ants/>.

(Continued)

*Primary Examiner* — Mary Cheung

(74) *Attorney, Agent, or Firm* — Haverstock & Owens LLP

(57) ABSTRACT

A method and system for buying and selling services online includes a process for custom services, a commodity process and a collaborative workspace on a website. The process for custom services includes the posting by a buyer of specific criteria for a desired service, the bidding by a seller to preform the service, and the selection of a seller by the buyer. The commodity process includes the posting by a seller of a service offering, the posting by the buyer of requirements for the purchase of the service offering, and the purchase of a service offering by the buyer. The commodity process may also include an optimization process that provides the buyer with an optimized list of service offerings. The collaborative workspace includes communication tools, a file structure, workbenches and project management tools used by the buyer and seller for facilitating the setup, development and release of one or more services.

30 Claims, 18 Drawing Sheets

U.S. PATENT DOCUMENTS

| | | | |
|---|---|---|---|
| 5,732,400 A | 3/1998 | Mandler et al. | |
| 5,794,207 A | 8/1998 | Walker et al. | |
| 5,835,896 A | 11/1998 | Fisher et al. | |
| 5,842,178 A | 11/1998 | Giovannoli | |
| 5,862,223 A | 1/1999 | Walker et al. | |
| 5,905,975 A | 5/1999 | Ausubel | |
| 5,924,082 A | 7/1999 | Silverman et al. | |
| 5,949,976 A | 9/1999 | Chappelle | |
| 5,956,715 A | 9/1999 | Glasser et al. | |
| 5,966,130 A | 10/1999 | Benman, Jr. | |
| 5,987,498 A | 11/1999 | Athing et al. | |
| 6,009,154 A | 12/1999 | Rieken et al. | |
| 6,041,307 A | 3/2000 | Ahuja et al. | |
| 6,049,777 A | 4/2000 | Sheena et al. | |
| 6,061,665 A | 5/2000 | Bahreman | |
| 6,064,980 A | 5/2000 | Jacobi et al. | |
| 6,078,906 A | 6/2000 | Huberman | |
| 6,092,049 A | 7/2000 | Chislenko et al. | |
| 6,101,482 A | 8/2000 | DiAngelo et al. | |
| 6,119,101 A | 9/2000 | Peckover | |
| 6,128,624 A | 10/2000 | Papierniak et al. | |
| 6,141,653 A | 10/2000 | Conklin et al. | |
| 6,154,731 A | 11/2000 | Monks et al. | |
| 6,161,099 A | 12/2000 | Harrington et al. | |
| 6,212,549 B1 * | 4/2001 | Page et al. | 709/205 |
| 6,223,177 B1 | 4/2001 | Tatham et al. | |
| 6,226,031 B1 | 5/2001 | Barraclough et al. | |
| 6,233,600 B1 | 5/2001 | Salas et al. | |
| 6,311,178 B1 | 10/2001 | Bi et al. | |
| 6,336,105 B1 | 1/2002 | Conklin et al. | |
| 6,374,292 B1 | 4/2002 | Srivastava et al. | |
| 6,415,270 B1 | 7/2002 | Rackson et al. | |
| 6,442,528 B1 | 8/2002 | Notani et al. | |
| 6,484,153 B1 | 11/2002 | Walker et al. | |
| 6,557,035 B1 | 4/2003 | McKnight | |
| 6,564,246 B1 | 5/2003 | Varma et al. | |
| 6,567,784 B2 | 5/2003 | Bukow | |
| 6,578,014 B1 * | 6/2003 | Murcko, Jr. | 705/26 |
| 6,598,026 B1 | 7/2003 | Ojha et al. | |
| 6,832,176 B2 | 12/2004 | Hartigan et al. | |
| 6,859,523 B1 | 2/2005 | Jilk et al. | |
| 7,069,242 B1 * | 6/2006 | Sheth et al. | 705/37 |
| 7,310,415 B1 | 12/2007 | Short | |
| 7,406,443 B1 | 7/2008 | Fink et al. | |
| 7,587,336 B1 * | 9/2009 | Wallgren et al. | 705/26 |
| 2001/0011222 A1 | 8/2001 | McLauchlin et al. | |
| 2001/0041988 A1 | 11/2001 | Lin | |
| 2002/0023046 A1 | 2/2002 | Callahan et al. | |
| 2002/0120522 A1 | 8/2002 | Yang | |
| 2002/0120554 A1 | 8/2002 | Vega | |
| 2002/0129139 A1 | 9/2002 | Ramesh | |
| 2002/0133365 A1 | 9/2002 | Grey et al. | |
| 2003/0046155 A1 | 3/2003 | Himmel et al. | |
| 2004/0063463 A1 | 4/2004 | Boivin | |
| 2004/0122926 A1 | 6/2004 | Moore et al. | |
| 2006/0095366 A1 * | 5/2006 | Sheth et al. | 705/37 |
| 2007/0078699 A1 | 4/2007 | Scott et al. | |
| 2010/0241482 A1 * | 9/2010 | Knyphausen et al. | 705/8 |

FOREIGN PATENT DOCUMENTS

| | | |
|---|---|---|
| WO | WO 01/73645 A1 | 10/2001 |

OTHER PUBLICATIONS bizbuyer.com web pages [online]. BizBuyer.com, Inc. [retrieved Aug. 18/21, 2000]. Retrieved from the Internet: <URL: http://www.bizbuyer.com/>.

BullhornPro web pages [online]. Bullhorn, Inc. [retrieved on Jan. 4, 2001 Retrieved from the Internet: <URL: http://www.bullhornpro.com/>.

Cassidy, M. Going for Broke. *San Jose Mercury News*, Monday, Aug. 16, 1999, pp. 1E and 4E.

efrenzy.com web pages [online]. eFrenzy, Inc. [retrieved on Aug. 22, 2000]. Retrieved from the Internet: <URL: http://www.efrenzy.com/index.jsp>.

Eisenberg, D. We're for Hire, Just Click. Time Magazine, Aug. 16, 1999, vol. 154, No. 7 [online], [retrieved on Aug. 19, 1999]. Retrieved from the Internet <URL: http: //www.pathfinder.com/time/magazine/articles/0,3266,29393,00.html>.

eworkexchange.com web pages [online]. eWork Exchange, Inc. [retrieved on Aug. 18/22, 2000]. Retrieved from the Internet: <URL: http://www.eworks.com/>.

eWork Exchange web pages [online]. eWork Exchange, Inc. [retrieved on Jan. 5, 2001]. Retrieved from the Internet: <URL: http://www.ework.com/>.

eWork ProSource web pages [online]. eWork Exchange, Inc. [retrieved on Jan. 3, 2001]. Retrieved from the Internet <URL: http://www.ework.com/>.

FeeBid.com web pages [online]. FeeBid.com [retrieved on Dec. 18, 2000]. Retrieved from the Internet: <URL: http://www.feebid.com>.

freeagent.com web pages [online]. FreeAgent.com [retrieved Aug. 18/22, 2000]. Retrieved from the Internet: <URL: http://www.freeagent.com/>.

guru.com.com web pages [online]. Guru.com, Inc. [retrieved Aug. 18, 2000]. Retrieved from the Internet: <URL: http://www.guru.com/>.

Herhold, S. Expert Advice Is Collectible for Start-up. *San Jose Mercury News*, Monday, Aug. 16, 1999, pp. 1 E and 6E.

hotdispatch.com web pages [online]. HotDispatch, Inc. [retrieved on Aug. 22, 2000]. Retrieved from the Internet: <URL: http://www.hotdispatch.com/>.

Humphreys, Paul et al., "A Just-in-Time Evaluation Strategy for International Procurement," 1998, MCB UP Limited, pp. 1-11.

"IBNL Forges into the Future of Buying and Selling with Source Interactive Software," Jan. 10, 1996, PR Newswire.

imandi.com web pages [online]. Imandi Corporation [retrieved on Aug. 22, 2000]. Retrieved from the Internet: <URL: http://www.imandi.com/>.

International Search Report for International Application No. PCT/US02/02291, dated Feb. 28, 2003.

Malone, Thomas W. et al., "*The Dawn of the E-Lance Economy*," Harvard Business Review, Sep.-Oct. 1998, pp. 145-152.

Netscape Selects Netopia as the Exclusive 'Virtual Office' Offering on the New Netscape Small Business Source Service, PR Newswire, May 11, 1998, Mountain View and Alameda, California.

onvia.com web pages [online]. Onvia.com [retrieved Aug. 22, 2000]. Retrieved from the Internet: <URL: http://www.onvia.com/usa/home/index.cfm>.

Opus360 web pages [online]. Opus360 Corporation [retrieved on Jan. 3, 2001]. Retrieved from the Internet: <URL: http://www.opus360.com/>.

PCT Search Report for International Application No. PCT/US00/23350 dated Dec. 27, 2000.

smarterwork.com web pages [online]. smarterwork.com, Inc. [retrieved on Aug. 22, 2000]. Retrieved from the Internet: <URL: http://www.smarterwork.com/>.

workexchange.com web pages [online]. WorkExchange, Inc. [retrieved Aug. 22, 2000]. Retrieved from the Internet: <URL: http://www.workexchange.com/unique/workexchange/index1.cfm>.

Davenport, Thomas H. and Keri Pearlson, "Two Cheers for the Virtual Office", summer 1998, abstract, retrieved from the Internet: <URL: http://www.pubservice.com/MSStore?ProductDetails.aspx?CPC=3944>.

PCT International Search Report and Written Opinion, PCT/US06/22734, Jun. 3, 2008, 5 pages.

Canadian Office Action dated May 17, 2010, Canadian Patent Application No. 2,382,201, Filed Aug. 24, 2000, ELANCE, Inc.

Shalil Majithia et al, "Reputation-based Semantic Service Discovery", IEEE Computer Society,13th IEEE International Workshops on Enabling Technologies:Infrastructure for Collaborative Enterprises, 2004, pp. 1-6.

* cited by examiner

| home | buy | sell | my elance | register | search | help |

Post an RFP | Fixed-Price Services

502

Post a Request for Proposal and Get Bids
Use this form to post your project. If you are a first-time user, you will be asked to provide a phone number or credit card in order to maintain the integrity of the eLance marketplace. Read about eLance security.
Get help Posting an RFP.
View Tips and How-To in eLance Resources.

Need Live Assistance?
Get help from a live person online or post a project by phone.

| Online Help | Post by Phone |

514
RFP Wizards
Also use these customized forms to post your project:

516
Business
- General
- Business Plan
- Data Entry
- Document Editing
- Presentations
- Research
- Transcription
- Translation

518
Computer
- General
- Computer Consulting
- IBM AS-400 Services
- Linux Related Services
- Software Development
- Web Hosting
- Web Site Development

Describe Your Project

Give your project a name*:                        ( * = Required Field )
[_____] 510                            504
Describe your project in detail*:
[_____]
[_____]
2,000 character limit. You can use HTML tags. Don't enter contact info.
What will you receive at the end of the project? (Deliverables)    512
[_____]
[_____]
Be as specific as you can. 2,000 character limit.
When do you want to receive the project?*
[Aug ▽] [11 ▽] [2000 ▽]
Who will own the rights to the final work?
[_____]
[_____]

Include Files

Upload any files relevant to the project: [_____] [UPLOAD]
Up to 10 files of any type.                                    506
Upload a faxed document or voice recording:
☐ Check this box to send a toll-free fax or make a voice recording. It will be attached to your project description.

Set Up the Bidding

Select the eLance marketplace for your project*:     508
[(Select One)              ▽]

509

Other: [_____]
If you selected Other in the pulldown menu, enter a brief description in the Other box.
How long do you want bidding to run?*
[____] days
How much do you estimate the project will cost?
US $ [_____]
Numeric characters only. This is only a guideline; bids may be higher or lower.

Figure 5a

| home | buy | sell | my elance | register | search | help |

Bid on a Project | Post a Service Offer

Post a Fixed-Price Service Offer

Use this form to post a description of a service with easily defined parameters and a standard per-unit price. Don't enter your email address or telephone number into this form. Contact info is released as part of a transaction. You can edit your offer at any time.

Describe Your Service

520 — What Type of Service Do You Provide? Required
  (Select One) ▽
  Other: [ ]
  The pull-down menu lists just some of the services that trade on eLance. If you don't see your service, select Other and then enter a one or two word description in the box also marked Other.

522, 510, 512 — What's Your Specialization? Required
  [ ]
  List the exact type of service you're offering. e.g., English-Italian (if you chose Business: Translation). Note: ONLY THE FIRST 25 LETTERS of your specialization will be immediately visible from the Service Offer Marketplace.

524 — Price/Unit: Required
  US$ [ ] / (Select One) ▽   Other: [ ]
  Pick a unit of measurement for your service from the menu above or enter your own unit in the box marked Other. Give the price for each unit in U.S. dollars.

526 — How Long Will It Take You to Deliver?
  [ ] Hours
  Enter a turnaround time in hours. Turnaround time must be entered as a number.

528 — Describe Your Service
  [ text area ]

530 — Upload Examples of Your Work for Buyers to Evaluate
  [ ]
  [ UPLOAD ]
  You can attach up to 10 files of any type, including images, text files and html files. View tips for uploading files.

532 — [ Preview ]

After pressing this button, you can review and edit your Offer before it's posted live.

Figure 5b

| home | buy | sell | my elance | register | search | help |

Bid on a Project | Post a Service Offer

Place a Bid

To bid for this project, you must be registered, and you must have a user profile containing at least 300 characters of information. Do not put your contact info in your bid, or it may be removed and your membership suspended. A * indicates a required field.

Back to Project Description

Need Help?

Get help now from a live person using online chat.

[ Online Help ]

534     510 Enter Your Bid

*Enter your bid amount :

US$ [_____] — 512

Selection is made on more than price. Bid can be above or below the buyer's estimate or other bids. Tips

536

*Enter the date by which you can deliver the final work:

[Aug ▽] [28 ▽] [2000 ▽]

Default is the date requested by the buyer. eLance uses United States Eastern Time.

538

Summarize your proposal: ( 2,000 character limit )

[                                                         △]
[                                                          ]
[                                                         ▽]

Upload a longer proposal if necessary. Don't enter contact info. If you do, your bid may be removed. You can get more information from the buyer by posting questions to the project message board.

530

Attach more info to your bid:

[ FILE UPLOAD ] [_____]

All updated files are publicly available. Include mockups of the completed work at your own risk. Tips

542

Include a fax or voice recording:

☐ Check this box to receive a free number that you can call to send a fax or make a voice recording, which will be attached to your bid. ( Publicly available. )

532 —— [ Preview My Bid ]

You must be registered to bid.

Figure 5c

| home | buy | sell | my elance | register | search | help |

Activity | Account | Edit Profile | Watch List | Log Out

— Logged in as alee. Log out.

Private Message Board for Garden Landscape Design Ideas

Enter Message

604 [text area]

Add Files

506 If you wish, upload files to complement your message.

[_____] [UPLOAD]

You can attach up to 10 files of any type, including images, text files and html files. View tips for uploading files.

[Post]                                    Use the My eLance Workspace

606  Name      Message            Time Posted     Download

Figure 6c

| home | buy | sell | my elance | register | search | help |

Bid on a Project | Post a Service Offer

RFPs: All Categories  [Add to My Watch List]

[Post Your RFP]

700
Current RFPs in Project Marketplace

Search RFPs: [        ] [GO!]
More RFPs: [All Categories ▽] [GO!]

FILTER BY [Categories: All ▽] [Closing: All ▽] [Listed: All]

| 702 ID | 704 Project Name | 706 Category | 708 Sub-category | 710 Initial Estimate | 712 # bids | 714 Average bid | 716 Time Left | 718 Buyer | Auth Status |
|---|---|---|---|---|---|---|---|---|---|
| 3161075 | user administration with php&mysql | Computer | Software Development | – | 0 | – | 28 d, 23 h+ | bfi | [-o-] |
| 3160993 | PHP & MySQL Expert | Computer | Consulting | US$ 1.51 | 0 | – | 2 d, 23 h+ | SilkWeb2000 | [-o-] |
| 3160845 | CopyWriting - 4 Website | Creative | Writing | US$1,200.00 | 2 | US$770.00 | 4 d, 22 h+ | CopierWatcher | |
| 3160307 | VenueZone Party Icons | Creative | Design | US$1.14 | 0 | – | 9 d, 22 h+ | liamcasey | [-o-] |
| 3159153 | Audio Streaming | Computer | Software Development | – | 0 | – | 3 d, 21 h+ | abhi7 | |
| 3159132 | datanuggets.com | Marketing | Sales-Domain Name | US$50,000.00 | 0 | – | 24 d, 21 h+ | dwilliams | [-o-] |
| 3159129 | Designing a Half page Color AD | Creative | Design | US$250.00 | 5 | US$610.00 | 21 h, 31 m+ | RC23 | ☎ |
| 3158229 | Creative Writting | Creative | Writing | US$30.00 | 10 | US$54.50 | 20 h, 26 m+ | dawnaavery2 | ☎ |
| 3156880 | Work at Home | Marketing | – | – | 0 | – | 29 d, 18 h+ | einstein | [-o-] |
| 3156837 | Logo & Stationery Design | Creative | Design | – | 11 | US$495.55 | 29 d, 18 h+ | yyhe | |
| 3156576 | Convert hard docs to PDF | Computer | Consulting | US$200.00 | 6 | US$166.58 | 2 d, 17 h+ | PGLink | |
| 3155060 | Powerpoint Touch-Up | Business | Report Production | US$60.00 | 13 | US$51.08 | 14 h, 17 m+ | Flashed1 | |

Figure 7

| home | buy | sell | my elance | register | search | help |

Post an RFP | Fixed-Price Services

Services: All Categories

[Add to My Watch List]

[Post Your Services]

Search Services: [ ] [GO!]
More Services: [All Categories ▽] [GO!]

Recently Purchased Services:
- ✓ -: US$20.00
- ✓ logos, web, photography: US$75.00
- ✓ writing, research, business support: US$10.00  MORE

800

Fixed-Price Services Available in All Categories

| FILTER BY | Categories: All ▽ | Feedback: All ▽ | Price/Unit: |

| 802 | 804 | 806 | 808 | 810 | 812 | 814 | 816 | 818 |
|---|---|---|---|---|---|---|---|---|
| ID | Action | Category | Sub Category | Specializations | Price | Unit | Seller | |
| 2033255 | Info & Buy | Creative | web design | all web design, html or wysiwyg | US$40.00 | Hour | rdgraphics | 5 |
| 2033205 | Info & Buy | Creative | Design | all design | US$50.00 | Hour | rdgraphics | 5 |
| 2118290 | Info & Buy | Business | Startup Services | Consulting | US$150.00 | Hour | SourceCFO | 5 |
| 2129818 | Info & Buy | Creative | Design | Consultant | US$30.00 | Hour | adamwho | 5 |
| 2115328 | Info & Buy | Creative | Design | Logo Design | US$300.00 | Item | suebee277 | 5 |
| 2040229 | Info & Buy | Computer | online promotions | Online Marketing | US$25.00 | Hour | sarah77mc | 5 |
| 2115344 | Info & Buy | Creative | Design | Brochure Design | US$400.00 | Item | suebee277 | 5 |
| 2229197 | Info & Buy | Creative | Design | Logo Design | US$35.00 | Hour | strongvisuals.com | 5 |
| 2072517 | Info & Buy | Creative | Design | Design/Production Services for Print | US$85.00 | Hour | Design_Pro | 5 |
| 2162954 | Info & Buy | Creative | Design | logos | US$350.00 | Item | garvey | 5 |
| 2263249 | Info & Buy | Computer | Software Development | Application Development | US$50.00 | Hour | ggarg | 5 |

Figure 8

METHOD AND APPARATUS FOR AN ELECTRONIC MARKETPLACE FOR SERVICES HAVING A COLLABORATIVE WORKSPACE

CROSS-REFERENCE TO RELATED APPLICATIONS

This application is a continuation of U.S. application Ser. No. 09/648,408, entitled "Method and Apparatus for an Electronic Marketplace for Services Having a Collaborative Workspace", filed Aug. 24, 2000 now U.S. Pat. No. 7,069,242, by Beerud D. Sheth and Srinivas Anumolu, which application claims priority, under 35 U.S.C. §119(e), from U.S. Provisional Patent Application Ser. No. 60/150,611, "Method and Apparatus for an Electronic Marketplace for Services Having a Collaborative Workspace," by Sheth and Anumolu, filed Aug. 24, 1999, their entirety of which is herein incorporated by reference.

BACKGROUND

1. Technical Field

The present invention relates generally to online marketplaces, and more particularly, to an online marketplace for services including a collaborative workspace.

2. Background of the Invention

The nature of business is changing. The management, procurement and delivery of services are becoming decentralized as businesses increasingly outsource for their needs. New kinds of business organizations are emerging as employees seek greater flexibility through working independently. Large, vertically integrated companies are being replaced by fluid, self-managed groups of diverse individuals who form online teams, engage in a common task and disband after the project's completion. In this new economy, there is a strong need for infrastructure that can facilitate sourcing, buying and selling services more efficiently.

The traditional market for services, both online and offline, is highly fragmented. In the offline world, a buyer of services has traditionally located service providers through the local telephone directory, print publications or personal referrals. Once a service provider was located, however, the buyer had to contact him or her, arrange a method or time to review his or her prior work or otherwise evaluate his or her qualifications for the project and negotiate a price. Even in the age of the Internet, thousands of service providers, both individuals and companies, offer their services, but their individual web sites or online postings are often difficult to find or do not disclose sufficient information regarding the quality of their work product, reputation or availability. Furthermore, a buyer of services still has to contact each vendor individually through email, evaluate their qualifications and negotiate specifications, availability and price on an individual basis. As a result, comparison shopping, negotiation and collaboration with services providers have traditionally been time-consuming, inefficient and costly for the buyer of services.

Online marketplaces for physical goods have successfully aggregated vendors and enabled customers to compare prices and make such purchases more efficiently. In contrast to online marketplaces for physical goods, however, online marketplaces for services are significantly more complex because each service is performed on a custom order basis and each end product is unique. The process of creating and delivering a service is more critical than with most products, as the buyer and seller of services must work collaboratively to define the parameters of the project and develop a finished product that meets the specifications of the buyer. In addition, unlike in product marketplaces, the lowest cost provider of services does not necessarily win the project because the buyer's decision may not only be based on price, but also on the quality of the service provider's work product, reputation and delivery date.

The fragmentation of the traditional market for services both online and offline has therefore created a strong need for infrastructure that can facilitate access to service providers and their services in an efficient manner.

SUMMARY OF THE INVENTION

The present invention offers buyers and sellers of services an online platform for the transaction, development and delivery of remote services. By uniquely combining (i) an exchange, (ii) a collaborative workspace and (iii) fulfillment processes, the described infrastructure enables buyers and sellers of services to come together online, specify the services required, identify and contact each other (or multiple service providers at once) regarding a particular project, transact with each other, develop collaboratively the final product online, deliver the service over an electronic network, and create and access virtual offices to maintain permanent information.

More specifically, the present invention joins buyers of services and independent service providers in temporary, collaborative networks to complete projects. By creating an open Request for Proposal (RFP) environment where interested service providers respond to the projects posted by buyers, the exchange component enables buyers and service providers to transact using competitive bidding as a pricing mechanism. Buyers and service providers can also transact in the commodity or "Fixed Price (FP) marketplace," where buyers browse through the listings of service providers online, evaluate and directly select a service provider at a posted fixed price for pre-specified services. In both of these formats, buyers evaluate service providers based on several criteria: (a) each service provider's online profile, which lists relevant skills and experience and includes a portfolio of past work; (b) the feedback service providers have received from prior projects conducted through the described infrastructure; and (c) through direct communication in the form of bids submitted and online discussions.

The collaborative workspace component enables buyers and service providers to collaborate on the project, even though they may be physically located thousands of miles apart. Each project is assigned a secure, dedicated workspace that provides online meeting facilities, project management and organization tools and industry-specific applications. Not only does the workspace facilitate development of the finished product, but it also enables final delivery of the service. Unlike marketplaces for physical goods, the "product" brokered by the described infrastructure is predominantly digital, and so the "delivery and handling" part of the process is completed online in the secure workspace shared by the buyer and service provider. Once the transaction is completed, both buyers and service providers rate each other. Buyers evaluate service providers on quality, responsiveness, timeliness and professionalism. Service providers rate buyers on clarity of project-specification, responsiveness, professionalism and reliability of payment.

The described invention is a tightly integrated infrastructure to provide an efficient and comprehensive system for the transaction, development and delivery of remote services. The invention affords buyers and sellers of services the flexibility to transact on an as-needed basis at any time or day or night and facilitates faster and more cost-effective outsourcing. When a project is finished after one day, one month or even one year, the network of independent entities that assembled to complete a specific project dissolves, and its members become independent agents once again until the next project arises.

BRIEF DESCRIPTION OF THE DRAWINGS

FIG. 5a is a screen shot of the user interface for posting a RFP.

FIG. 5b is a user interface for posting a fixed-price service offer.

FIG. 5c is a user interface for placing a bid on a project.

FIG. 6c is a screen shot of a user interface for a private message board.

FIG. 7 is a user interface showing a list of current requests for proposals (RFPs) available on the website.

FIG. 8 is a user interface showing a list of current fixed-price services available on the website.

DETAILED DESCRIPTION OF THE PREFERRED EMBODIMENTS

Figure 1:
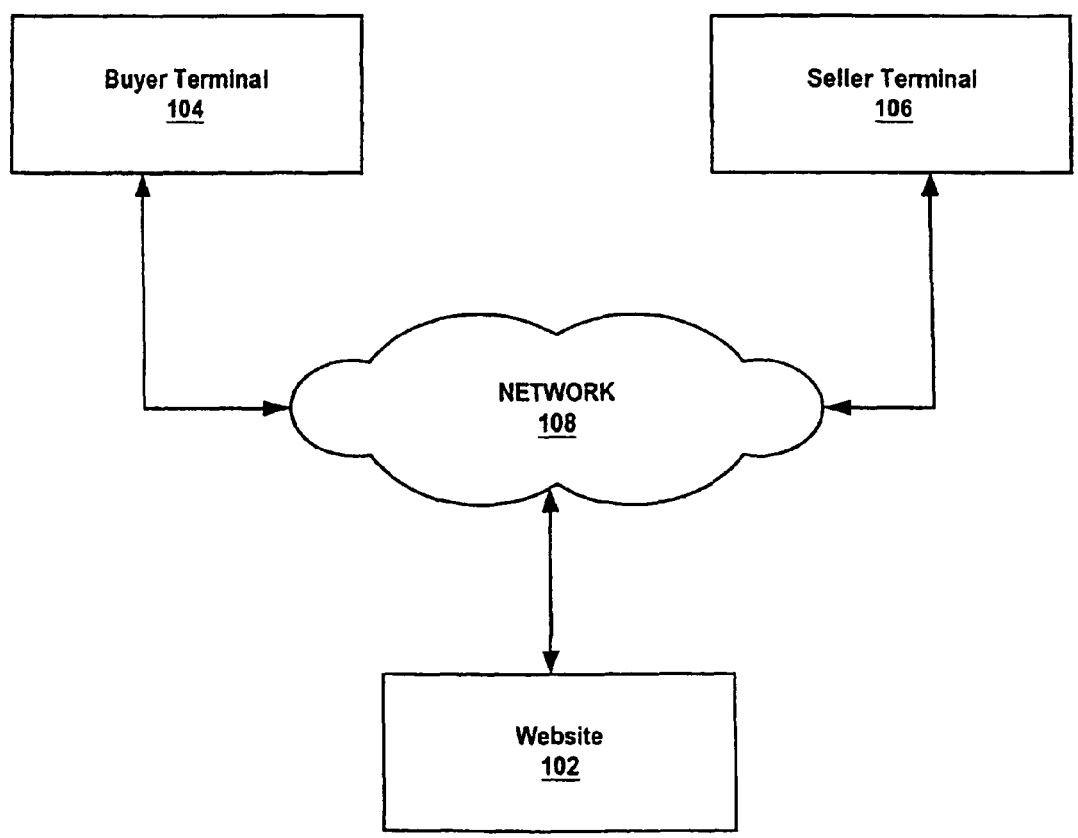
FIG. 1 is a diagram of a system including a described embodiment of the present invention.

FIG. 1 is a diagram of a system including a described embodiment of the present invention. The system includes a server hosting a website 102 (hereinafter "website"), a buyer terminal 104, a seller terminal 106 and a network 108, such as the Internet. The buyer terminal 104, the seller terminal 106 and the website 102 are all connected via the network 108. As a result, the buyer and the seller can communicate via their terminals 104, 106 using the website 102. In this embodiment, the buyer terminal 104 and the seller terminal 106 may include one or more computer systems such as desktop computers, laptop computers, network computers, handheld data storage devices, wireless communication devices, cellular telephones, etc. A preferred embodiment of the present invention is implemented in a client-server environment as shown herein. The Internet is one example of a client-server environment. However, any other appropriate type of client-server environment, such as an intranet, a wireless network, a telephone network, etc., may also be used. The present invention is not limited to the client-server model and could be implemented using any other appropriate model. The described embodiment uses the world-wide-web, although other protocols may be used and other, newer versions of the web may also be used.

Figure 2:
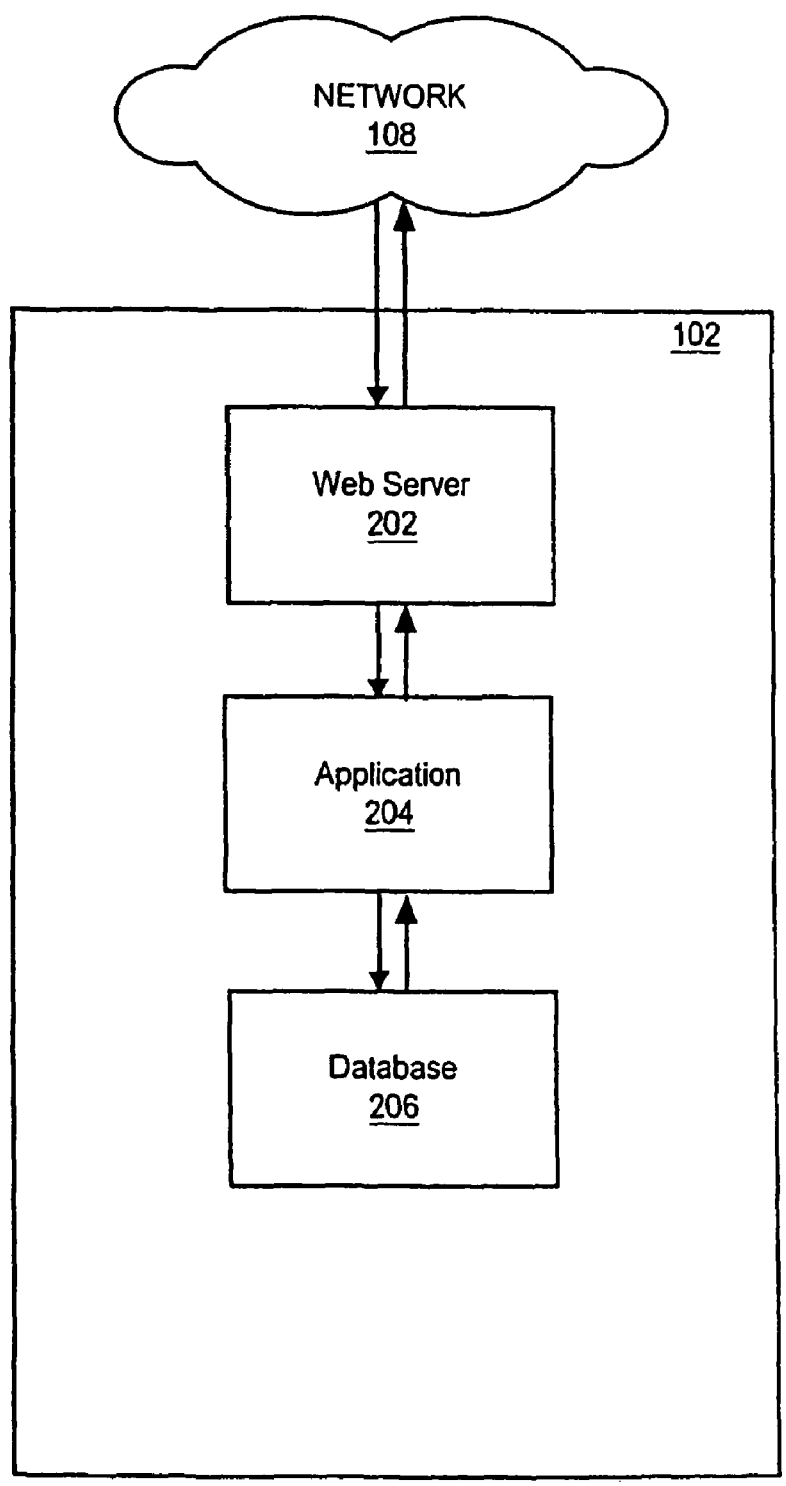
FIG. 2 is a diagram of an example of a server site.

FIG. 2 is a diagram of the website 102. The website 102 includes a web server 202, an application 204 and a database 206. The web server 202 provides the connection to the network 108. The application 204 implements the steps necessary to communicate with the buyer terminal 104 and the seller terminal 106. The application 204 further generates information based on the communications with the buyer terminal 104 and the seller terminal 106. The database 206 includes memory storage of information received from the buyer terminal 104 and the seller terminal 106 and information generated by the application 204. The generation and storage of information is discussed in greater detail below.

Although, in this embodiment, the server 202 is shown as a single unit, it may include one or more computer systems. The generation and storage of information as described herein is preferably performed by instructions stored in a memory and executed by a computer processor, although the invention is not limited to this embodiment. These instructions may be stored on a computer-readable medium, such as a floppy disk, CD ROM, or any other appropriate storage medium.

Figure 3:
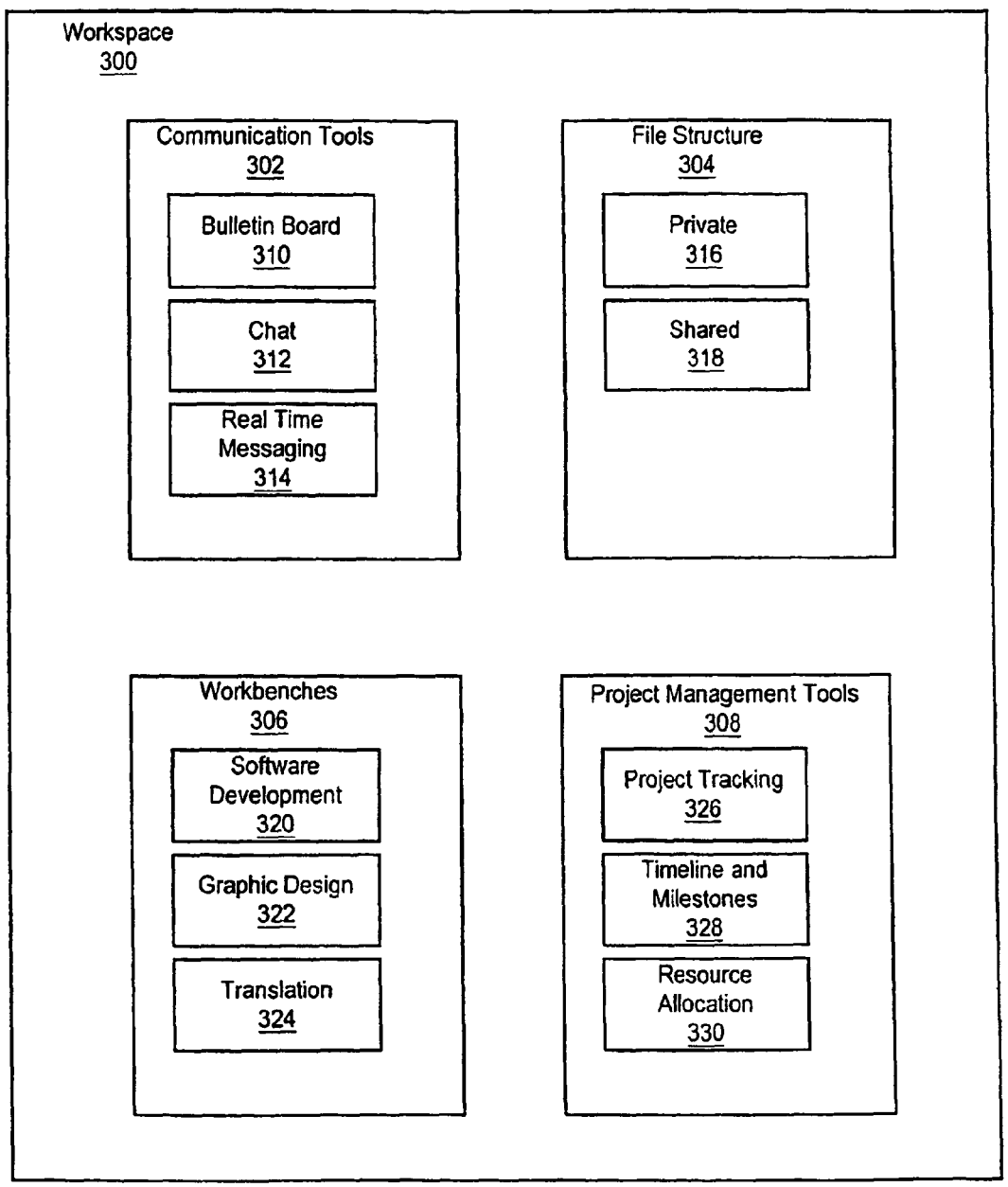
FIG. 3 is a block diagram of a data structure for a collaborative workspace.

FIG. 3 is a block diagram of a data structure for a collaborative workspace 300. The application 204 generates a unique workspace 300 for each project that is initiated using the website 102. The workspace 300 is stored in the database 206. The workspace 300 is where sellers develop and deliver services. Buyers can track the service as the seller develops it within the workspace 300 and then can pick up the finished service from the workspace 300. The workspace 300 includes communication tools 302, a file structure 304, workbenches 306, and project management tools 308. The communication tools 302 facilitate communications between the buyer and the seller and may include one or more bulletin or message board systems 310, real time chat room systems 312, and real time messaging systems 314. The communication tools 302 may also include any other means of communication that is implemented over a network such as integrated online meetings with real time document sharing and annotation, web tours, and application sharing. The buyer and the seller may use the communication tools 302 to discuss the details of their project anytime after the application 204 has initiated the project.

The file structure 304 includes private folders 316 and shared folders 318. The file structure is discussed in more detail in the description of FIG. 4.

The workbenches 306 may include at least software development 320, graphic design 322, and translation 324 each of which may be used by the seller for the development of services. The workbenches 306 may also include web-enabled versions of routine-use products, productivity tools for efficient work, and industry-specific workbenches.

The industry-specific workbenches are specially designed for the type of service provided. For instance, for a software services provider, the workbenches may include telnet access to a remote host, a file editor for editing text files, a compiler, a source code control system for tracking source code versions, a debugging environment for debugging remote code, a test environment for evaluating software, deployment and remote hosting of software applications, and access to other third party tools. Another example of industry-specific workbenches lies in graphic design services. Workbenches for this area include applications such as AutoCAD and Photoshop, graphic filters and software plug-ins for industry standard software tools, tools for inserting digital watermarks to prevent piracy, access to third party tools, and access to collections of clip-art, photographs, caricatures, etc.

Since the services are being developed and delivered online and may involve multiple vendors working together on one or more projects, project management tools 308 are used to facilitate the organization of these multiple, simultaneous projects. The project management tools include tracking project status in summarized and detailed forms 326, tracking project timelines and milestones 328, and resource, cost and time allocation 330.

Buyers and sellers may also use the workspace 300 even when they are not currently transacting through the online marketplace. For example, if a seller does not currently have a buyer for a service, the seller may still develop the service and create and store files in the workspace 300. Similarly, when buyers and sellers are not currently transacting they may still maintain a virtual office within the website 102. Buyers may store details on their service needs, preferences, transaction history, billing and preferred vendors. Sellers may store details on skills and certification, reputation, transaction history, billing and preferred buyers. This information is maintained in the database 206 of the website 102.

Figure 4:
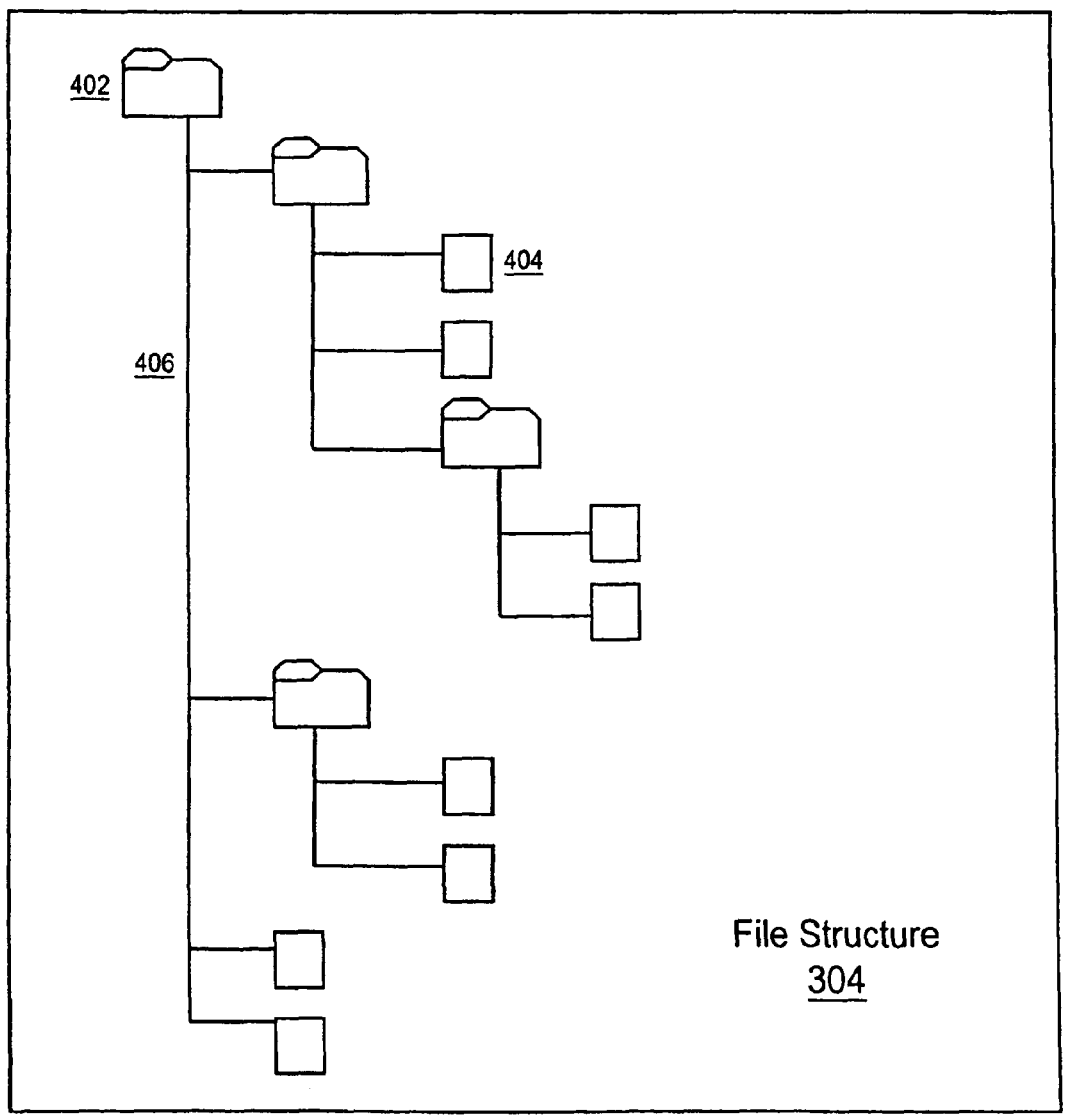
FIG. 4 is a diagram of one embodiment of a file structure used to implement workspaces.

FIG. 4 is a diagram of one embodiment of a file structure 304. The file structure 304 includes folders 402 and files 404 organized in a manner commonly found on computer systems. Each folder 402 may contain one or more additional folders 402 and/or files 404. The files 404 and folders 402 are organized in a hierarchical manner 406 that facilitates easy access to each file 404. The file structure 304 may be the same for both the private workspace 316 and the shared workspace 318. The workspace 300, however, is not limited to this file structure 304 and may also use other methods of organizing stored files. When accessing files 404 in the workspace 300 through the use of the file structure 304, the buyer and seller may use various operators to manipulate the files 404. These operators may include creating new files, editing files, storing links to web pages in the form of URLs, uploading and downloading files from/to a local computer, renaming files, and moving files. The ability of the buyer and seller to use these operators may be restricted for certain files or certain versions of a file. For instance, access to files 404 in a private folder 316 is restricted to either the buyer or the seller depending on which of them owns the files. Access to files 404 in a shared folder 318 may be accessible by both the buyer and seller of a given project but not by all users of the marketplace. A seller may also specify that a certain file be accessible to other sellers or be publicly available.

FIG. 5a is a screen shot of the user interface for posting a RFP. This page 502 includes a project description area 504, an upload area 506, and a bidding area 508. These areas contain user prompts 510 and areas for the user to enter information 512 based on these prompts 510. In the bidding area 508, the user may select a marketplace for the project. The user may choose this marketplace from a selection of categories 509 or may define another category for the project. The page 502 may also contain RFP wizards 514. The wizards 514 are used to customize the prompts 510 in the project description area 504, upload area 506, and bidding area 508. The wizards 514 vary by category 516 and subcategory 518. By activating a wizard 514 in a certain category 516 or subcategory 518, the user can have access to prompts 510 that are customized to that category 516 or subcategory 518. In this manner, the user is able to post an RFP with information that is tailored to the type of project that the user is posting.

FIG. 5b is a user interface for posting a fixed-price service offer. The seller, or service provider, provides the information for the fixed-price service offer. Like the interface for posting a RFP, this interface contains user prompts 510 and areas for the user to enter information 512 based on these prompts 510. The areas include the type of service offered 520, the service provider's specialization 522, the price per unit for the service 524, the delivery time 526, and a description of the service 528. The interface also includes an upload area 530 where the service provider may attach files for the buyer to evaluate. The interface also contains a preview button 532 that allows the seller to see the fixed-price service offer before it is posted.

FIG. 5c is a user interface for placing a bid on a project. This interface, like the previous interfaces, also contains prompts 510 and areas for the user to enter information 512 based on these prompts 510. The areas include the amount of the bid 534, the date for delivering the service 536, and a summary of the proposed service 538. Like the interface for posting a fixed-price service offer, this interface contains an upload area 530 and a preview button 532. The interface also includes a box 542 that the user may check in order to attach a fax or voice recording to the bid.

Figure 6A:
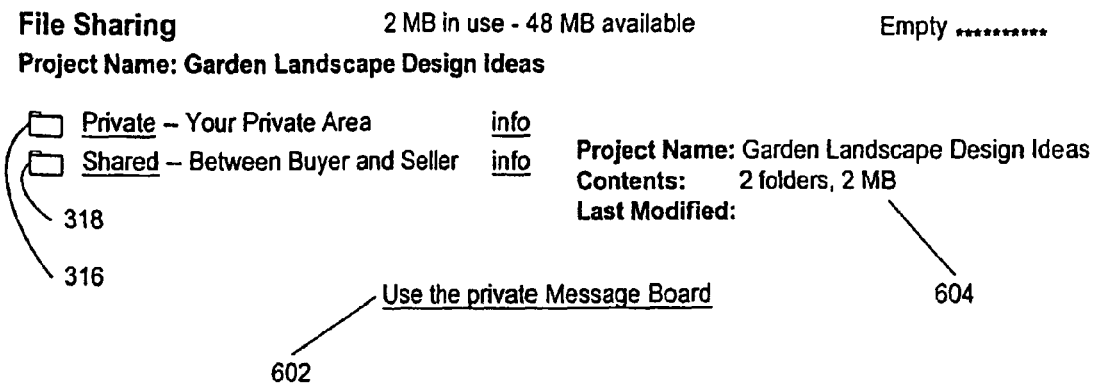
FIG. 6a is a screen shot of the user interface for per project workspaces.

FIG. 6a is a screen shot of the user interface for per project workspaces. As described in the discussion of FIG. 3, the application 204 automatically creates a workspace 300 for each project that is initiated. In this embodiment, the user interface includes a private folder 316 and a shared folder 318. The shared folder 318 contains files 404 accessible by both the buyer and the seller. The private folder 316 contains files 404 accessible by either the buyer or the seller, but not both. The user may move back and forth between the shared and private folders 318, 316 in order to access the desired files 404. The user may also access a private message board through link 602. The user interface for the workspace 300 includes information 604 about the project, which may include the project name, the size of the files uploaded in the workspace 300, and the date the workspace 300 was last modified.

Figure 6B:
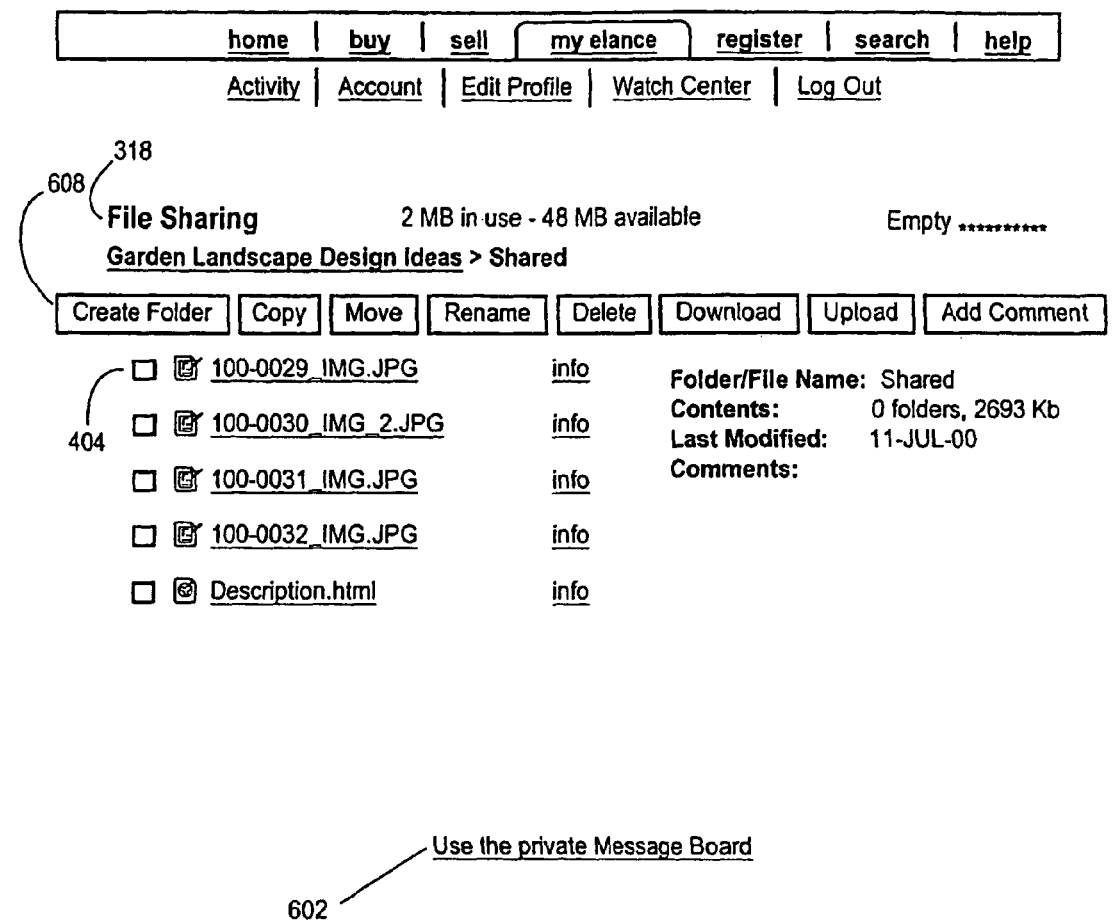
FIG. 6b is a screen shot of a user interface for a shared folder.

FIG. 6b is a screen shot of an interface to a shared folder 318. From the shared folder 318, the user may access any shared files 404. The user may use the operators 608 to manipulate the files in the folder 318. The operators 608 may include creating a folder, or manipulating a file by copying, moving, renaming, deleting, downloading, uploading, or adding comments to that file.

FIG. 6c is a screen shot of a private message board. The private message board includes a text entry area 604 and an upload area 506. Once the user enters a message in the text entry area 604 and posts the message, the message may be accessed from the message retrieval area 606. The message retrieval area 606 may include information such as the user's name, the title of the message, and the time the message was posted. Both the buyer and the seller have access to the private message board. The user may use the upload area 506 to include files 404 with the user's message.

FIG. 7 is a user interface showing a list 700 of current requests for proposals (RFPs) available on the website 102. Each RFP is submitted by a buyer. The list 700 includes information about each RFP, such as the project ID 702, the project name 704, the category 706 and subcategory 708, the initial estimate 710 for the project, the number of bids 714 made on the project, the amount of the average bid 714, the time left 716 to bid on the project, and the buyer's name 718. The seller may browse this list of RFPs and use the information contained in the list to choose one or more projects on which to bid.

FIG. 8 is a list 800 of current fixed-price services available on the website 102. Each entry in the list 800 is a service offering submitted by a seller. The list 800 includes information about each offered service, such as the project ID 802, the available actions 804 to take on the project, the category 806 and subcategory 808 of the project, the specializations 810 concerning the project, the price 812, the unit 814 of measurement for the price, the seller's name 816, and the rating 818 of that seller. The buyer may browse the list 800 of services and use the information provided to help with the buyer's purchasing decision. The buyer may also choose one of the actions 804 to find out more information about the offered service or to purchase the service.

Figure 9:
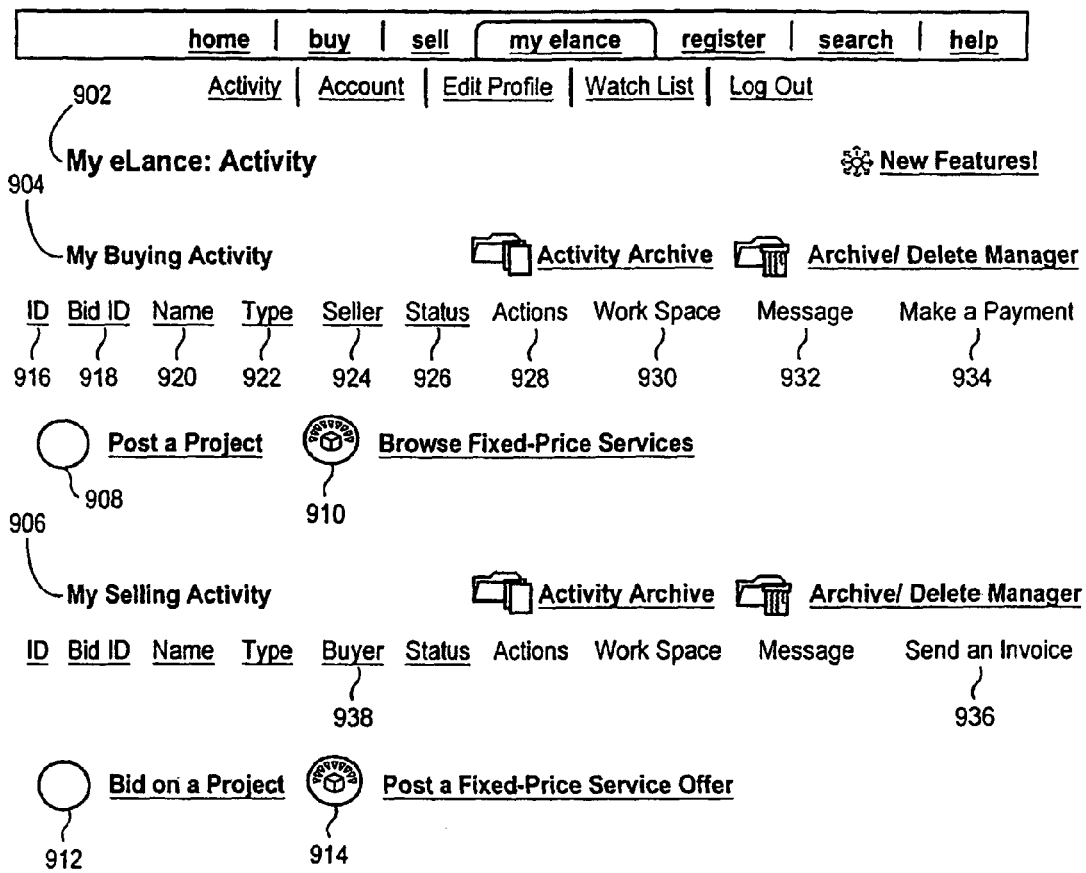
FIG. 9 is a user-specific page on the website.

FIG. 9 is a user-specific page 902 on the website 102. The user may be both a buyer and seller of services, thus there is space for both the user's buying activity 904 and the user's selling activity 906. As a buyer, the user may post 908 a project, i.e., an RFP, or the user may browse 910 the fixed-price services offered by sellers. As a seller, the user may bid 912 on an RFP, or the user may post 914 a fixed-price service offer. Once the user has initiated any buying and/or selling activity, information about that activity is displayed in the appropriate space 904, 906. The information includes the project ID 916, the bid ID 918, the name 920 of the project, the type 922 of project, the seller's name 924 or the buyer's name 938, the status of the project, 926, the actions 928 available for the project, access to the workspace 903, and access to any messages 932 concerning the project. As a buyer, the user has the option to make a payment 934 and as a seller the user has the options to send an invoice 936 to the buyer. With the user-specific page 902, the user is able to access all projects in which the user is involved as either a buyer or a seller.

Figure 10:
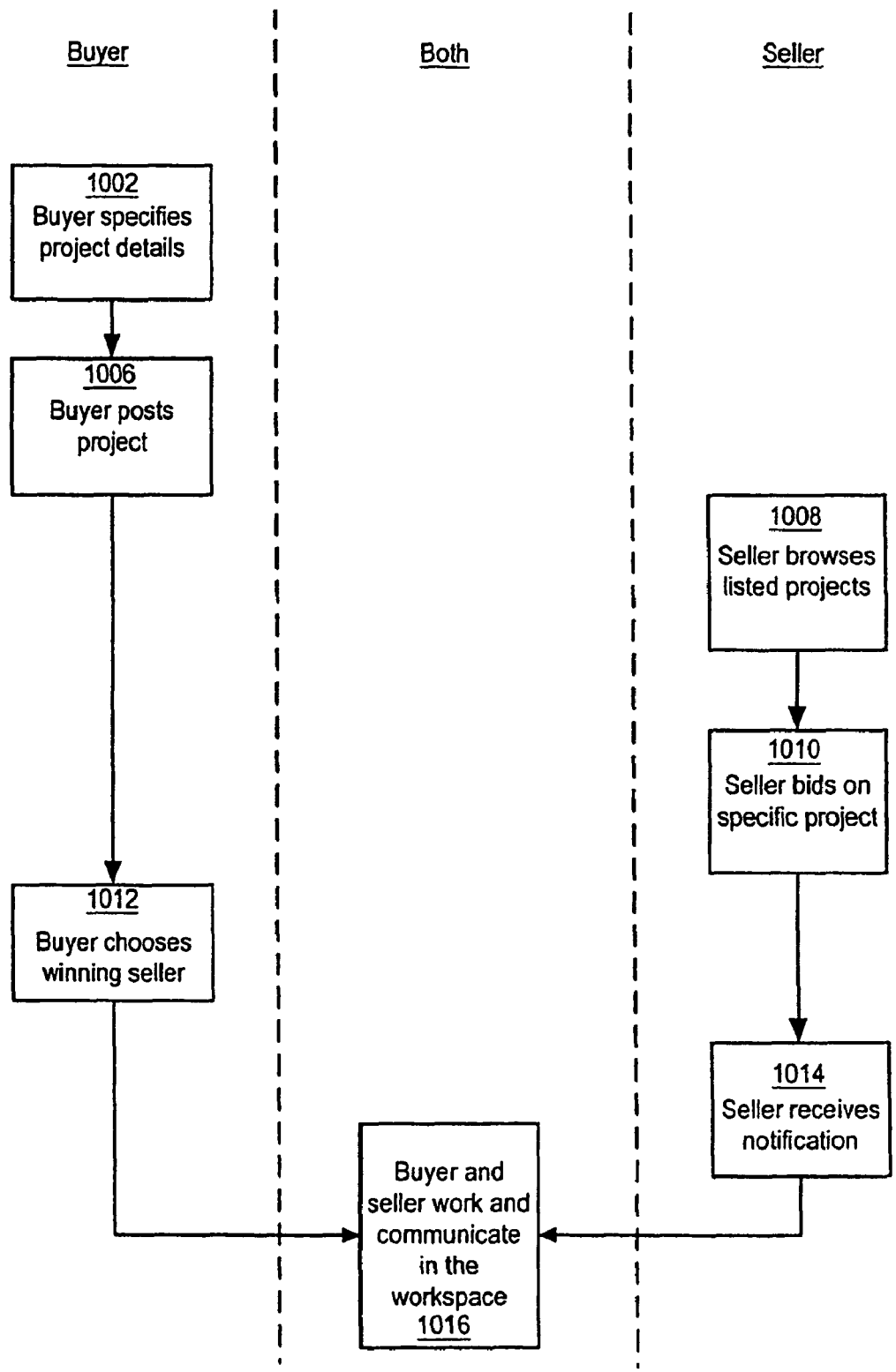
FIG. 10 is a flow diagram of the RFP process.

FIG. 10 is a flow diagram of the RFP process. This process is initiated by the buyer. First, the buyer specifies 1002 the project details. The project details may include a project name 704, a description of the service that the buyer is requesting, the category 706 and subcategory 708 for the project, desired pricing 710, and timelines 716. The buyer may also upload relevant files or voice recordings as part of the project details. The buyer then posts 1006 the project. Once the buyer posts 1006 the project, the application 204 adds the project to the list 700 of current RFPs on the website 102. Next, the seller browses 1008 the listed projects. The seller may then participate in an auction for a project by bidding 1010 on that project. The buyer chooses 1012 one or more winning sellers, and these sellers receive 1014 notification of the buyer's choice. The seller may then accept the project. Once the seller has accepted the project, the buyer and seller may work and communicate 1016 in the workspace 300.

The auction may be a regular RFP auction or a Dutch auction. In a regular auction, the buyer specifies the bidding duration, and then sellers may bid on the project. Unless the buyer extends the bidding duration, the auction automatically closes when this duration is reached. In a Dutch auction, the buyer chooses more than one seller to perform the service. In a preferred embodiment, the sellers will perform the service for the same price. The buyer does not have to specify that more than one seller will be selected but has the option to choose more than one seller at any point in the process after the RFP is posted.

Figure 11:
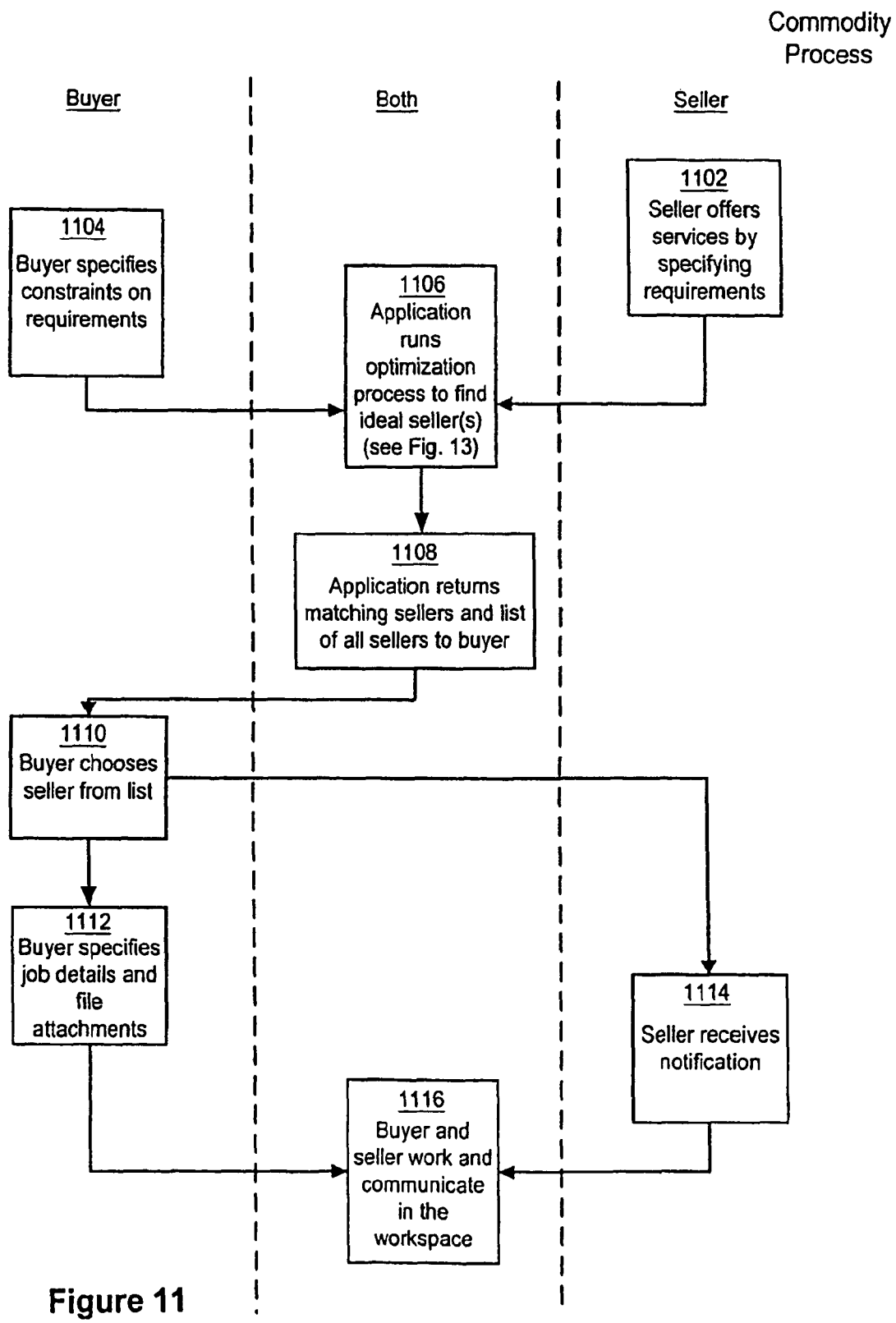
FIG. 11 is a flow diagram of the commodity process.

FIG. 11 is a flow diagram of the commodity process. For commodity services, buyers do not need to run an auction. The seller offers services for purchase by specifying 1102 category, price, quantity, availability, turnaround time and other parameters that the seller updates periodically. In the preferred embodiment, the buyers specify 1104 the category and price of the desired service, and the acceptable feedback rating for the seller. The buyer may also specify other constraints such as turnaround time, desired quality, etc. Within the website 102, the application 204 uses 1106 optimization techniques to automatically satisfy as many of the buyer's constraints as possible. The optimization process is discussed further below. The application returns 1108 matching sellers and a list of all sellers. The buyer then chooses 1110 a seller from the optimized list. The buyer specifies 1112 the job details and the file attachments, which are then loaded by the application 204 into the workspace 300 for the project. The application 204 notifies 1114 the seller of the buyer's choice. The buyer and seller work and communicate 1116 in the workspace 300.

For both custom and commodity services, as the process unfolds, the application 204 proactively alerts the market participants to relevant events, such as whether the auction for a project has closed, whether the seller has accepted or declined a project, and whether a project is completed. The described embodiment can contact the buyer and seller with email, pager, phone, fax, mobile phone, etc. The options for being contacted are specified by the user. For instance, a seller may choose to be called at a certain phone number during certain times of the day. This process of reaching the buyer and seller through means other than the network 108 allows the website 102 to bridge the offline and online worlds by notifying the participants in the real world of events that occur in the online world.

Market participants that transact with each other using the website 102 are able to rate their counter-parties. These ratings are stored in the database 206. In a preferred embodiment, buyers and sellers are each rated among several distinct criteria. The feedback may include whom a buyer or seller has worked with in the past, what comments the rater had, and even contact information to facilitate using the rater as a reference. Since the buyer and seller are collaborating on the project, the feedback is bilateral with the buyer rating the seller and the seller rating the buyer. The feedback is accessible to all users of the marketplace. The feedback is not averaged for the specific user rather each project has unique feedback even if the seller or buyer has been involved in more than one project. This feedback system is an effective counter-measure to fraud in the marketplace. Reputation is important in services because services frequently involve recurring transactions and not onetime transactions. Vendors will realize the importance of developing a positive reputation in order to win more auctions and also increase their pricing. The reputation they develop will also dissuade venders from doing transactions off-line as then those transactions will not add to their reputation.

Figure 12:
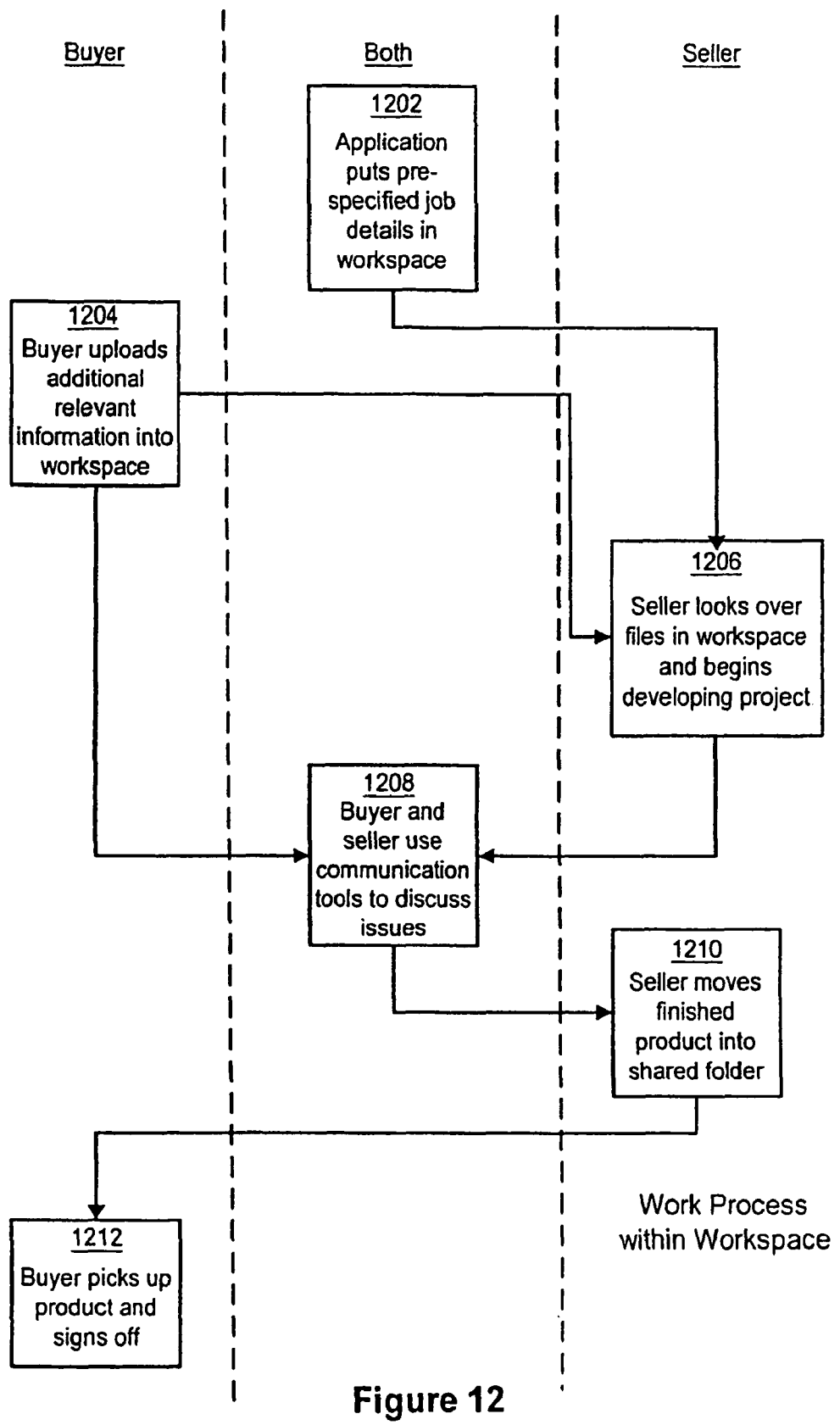
FIG. 12 is a flow diagram of a work process within the sandbox.

FIG. 12 is a flow diagram of an example work process within the workspace 300. The application 204 puts 1202 the job details and file attachments that were previously specified 1112 by the buyer into the workspace 300. The buyer may then upload 1204 additional, relevant information into the shared or private folder 318, 316 in the workspace 300. The seller then looks over 1206 the files in the shared folder 318 of the workspace 300. The seller next begins developing the project using development tools and storing files in the seller's private folder 316. During the development time, the buyer and seller may use communications tools 302 to discuss 1208 issues surrounding the service development. Once the project is completed, the seller moves 1210 the finished product into the shared folder 318 of the workspace 300. The buyer then coordinates with the seller regarding payment for the services, picks up 1212 the released product from the workspace 300, and signs off. The seller can also develop the project on his local machine and upload the results to the workspace, but this loses much of the advantage of having the workplace, since the buyer is less able to track the progress of the project.

Figure 13:
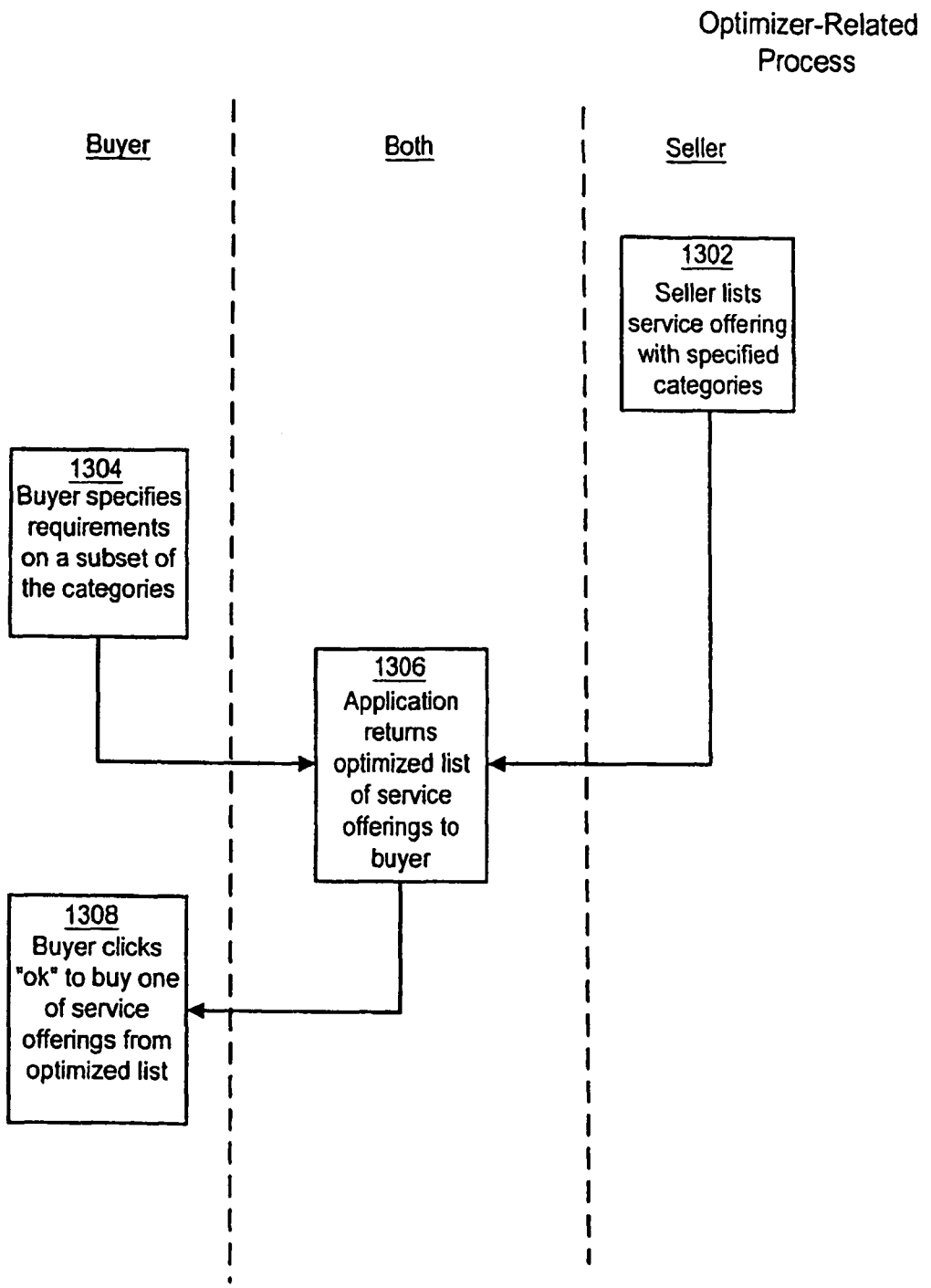
FIG. 13 is a flow diagram of the optimizer related process used for commodity services.

FIG. 13 is a flow diagram of the optimizer-related process used for commodity services. This process is used to assist the buyer in choosing a service offering for purchase. The process is initiated by the seller when the seller lists 1302 one or more offerings. These offerings are displayed in the list 800 of fixed-price services shown in FIG. 8. The seller specifies a number of requirements which may include price, quantity, ownership rights, and delivery time for each offering (see FIG. 5). The buyer specifies 1304 the requirements on a subset of these categories, e.g., the buyer may specify 1304 a required price and quantity or a required quantity and delivery time. The requirements may also be in ranges, e.g., delivery anytime in August or price $15-$20 per hour. The application then returns 1306 the optimized list of service offerings. This optimization process is discussed below in detail in connection with FIG. 14. The buyer clicks 1308 "ok" to buy one of the service offerings from the optimized list.

Figure 14:
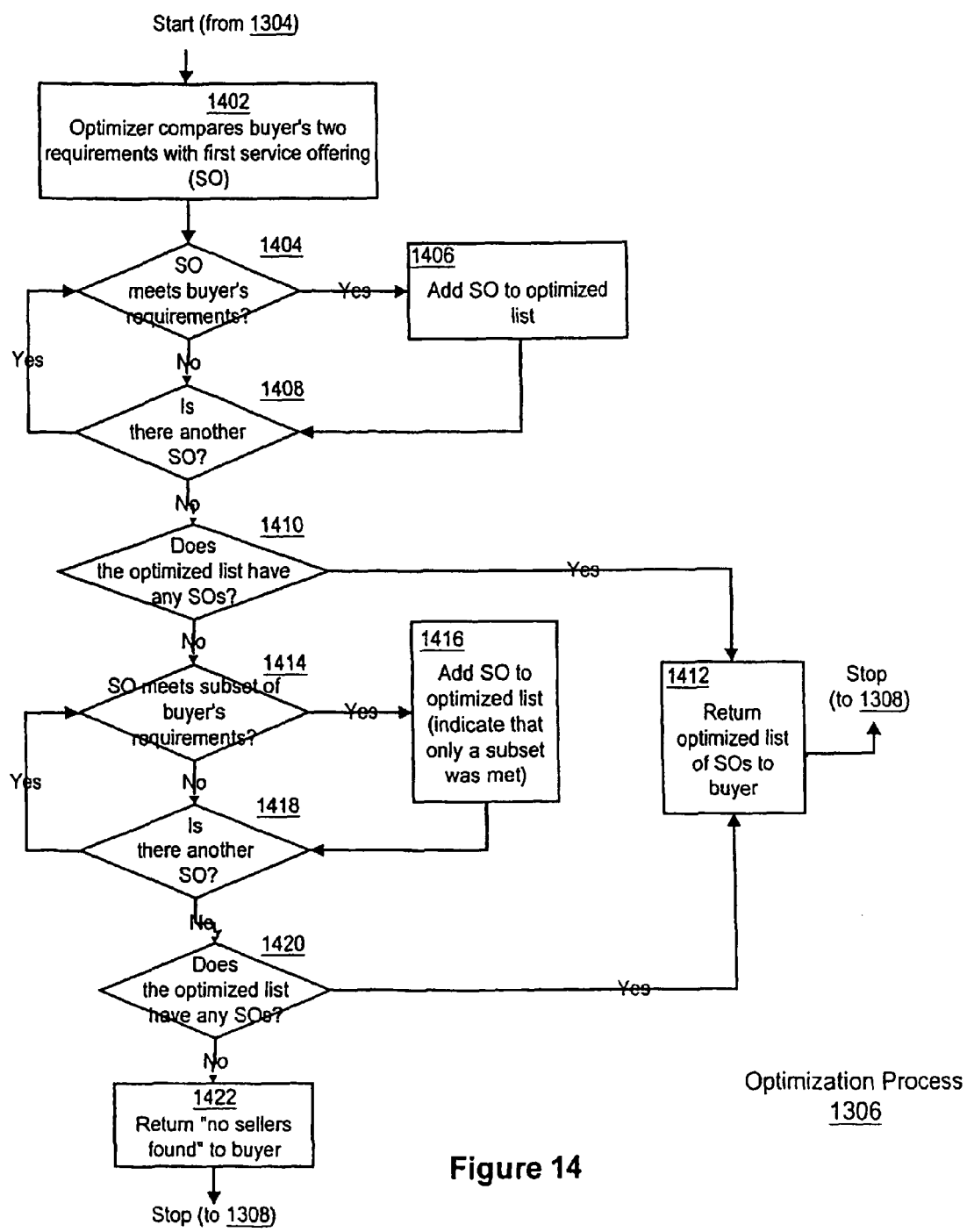
FIG. 14 is a flow diagram of the optimization process.

FIG. 14 is a flow diagram of the optimization process 1306. The optimizer compares 1402 the buyer's two requirements with the first service offering. If the service offering meets 1404 both of the requirements of the buyer, then that service offering is added 1406 to the optimized list of service offerings. If the service offering does not meet 1404 the requirements, then the application looks 1408 for another service offering. The application also looks 1408 for another service offering after a service offering is added 1406 to the optimized list. In both cases, if there is another service offering, then the application does the same comparison 1402 for the next service offering.

If there are no more service offerings, then the application checks whether the optimized list contains 1410 any service offerings. If the optimized list contains 1410 service offerings, then the application returns 1412 the optimized list of service offerings to the buyer. If the optimized list contains 1410 no service offerings, then the application again compares the buyer's two requirements with the first service offering. If the service offering meets 1414 one (or a subset) of the buyer's requirements, then that service offering is added 1416 to the optimized list. Optionally, the offering is noted on the list as having met only a subset of the requirements. If the service offering does not meet 1414 any of the buyer's requirements, then the application checks 1418 for another service offering. The application also checks 1418 for another service offering after adding 1416 a service offering to the optimized list. As above, if there is another service offering, then the application checks whether the next service offering meets 1414 one of the buyer's requirements.

If there are no more service offerings for the second comparison round, then the application checks whether the optimized list contains 1420 any service offerings. If the optimized list contains 1420 service offerings, then the application returns 1412 the list of service offerings to the buyer. If the optimized list contains 1420 no service offerings, then the application returns the message "no sellers found" to the buyer.

We claim:

1. A computer implemented method comprising:
    accepting a posting on a website of a project that a buyer wants completed, wherein the buyer identifies a prerequisite skill at least for a selected service provider;
    accepting registration of service providers, wherein the service providers identify at least one particular skill they possess;
    maintaining a database of registered service providers;
    receiving a qualified bid on the project at least from the selected service provider, wherein the selected service provider is registered and possesses the prerequisite skill;
    the buyer choosing the selected service provider from among one or more qualified bids; and
    providing the buyer and the selected service provider a collaborative workspace created for the project, wherein the collaborative workspace is configured to allow at least one of the buyer and the selected service provider to access the collaborative workspace after exiting the collaborative workspace.

2. The computer implemented method of claim 1, wherein the posting includes at least a project name, a project description, a category, and a price estimate.

3. The computer implemented method of claim 1, wherein the one or more qualified bids are received in one of a closed auction, an open auction, and a Dutch auction.

4. The computer implemented method of claim 1, wherein the collaborative workspace includes:
    one or more communication tools;
    a file structure;
    one or more workbenches; and
    one or more project management tools.

5. The computer implemented method of claim 4, wherein the file structure includes at least one private folder.

6. The computer implemented method of claim 4, wherein the file structure includes at least one shared folder.

7. The computer implemented method of claim 4, wherein the one or more workbenches are industry specific to the project.

8. The computer implemented method of method 1, wherein the collaborative workspace is accessible by only the buyer and the selected service provider.

9. The computer implemented method of claim 1, wherein both the buyer and selected service provider rate each other.

10. The computer implemented method of claim 1, wherein the collaborative workspace is accessible when the buyer and seller are not transacting.

11. The computer implemented method of claim 1, wherein the collaborative workspace is configured as a virtual office within the website.

12. The computer implemented method of claim 1, wherein the posting includes files and/or recordings.

13. The computer implemented method of claim 1, further comprising the buyer digitally receiving a tangible product for the project.

14. The computer implemented method of claim 13, wherein the digitally receiving step comprises moving the tangible product to a shared folder to be accessed by the buyer.

15. A computer implemented method comprising:
    accepting registration of service providers, wherein the service providers identify at least one particular skill they possess;
    maintaining a database of registered service providers;
    accepting on a website a posting of at least one service offering at least by a selected service provider who is registered;
    providing a database containing posted service offerings;
    the website receiving requirements for the at least one service offering from a buyer, including the requirement that the selected service provider possesses a prerequisite skill;
    the website returning an optimized list of service offerings to the buyer in accordance with the buyer's requirement for the prerequisite skill and other specified requirements;
    the buyer choosing the selected service provider;
    the buyer specifying a project to be completed; and
    providing the buyer and the selected service provider a collaborative workspace created for the project, wherein the collaborative workspace is configured to allow at least one of the buyer and the selected service provider to access the collaborative workspace after exiting the collaborative workspace.

16. The computer implemented method of claim 15, wherein at least one of the buyer's requirements is inflexible.

17. The computer implemented method of claim 15, wherein the optimized list includes service offerings that meet at least a subset of the buyer's requirements.

18. The computer implemented method of method 15, wherein the collaborative workspace is accessible by only the buyer and the selected service provider.

19. The computer implemented method of claim 15, wherein both the buyer and the selected service provider rate each other.

20. The computer implemented method of claim 15, wherein the collaborative workspace includes:
   one or more communication tools;
   a file structure;
   one or more workbenches; and
   one or more project management tools.

21. A computer implemented method comprising:
   accepting registration of service providers, wherein the service providers identify at least one particular skill they possess;
   maintaining a database of registered service providers;
   accepting on a website a posting of at least one service offering for a project at least by a selected service provider;
   providing a database containing posted service offerings;
   receiving requirements for the at least one service offering from a buyer, including the requirement for the selected service provider to possess a prerequisite skill;
   the buyer viewing service offerings posted by the registered service providers whose particular skill matches the prerequisite skill;
   the buyer choosing the selected service provider; and
   providing the buyer and the selected service provider a collaborative workspace created for the project, wherein the collaborative workspace is configured to allow at least one of the buyer and the selected service provider to access the collaborative workspace after exiting the collaborative workspace.

22. The computer implemented method of claim 21, wherein the at least one service offering includes at least one sub-category which further describes other skills the selected service provider possess.

23. The computer implemented method of claim 21, wherein the at least one service offering includes an area of the selected service provider's specialization.

24. The computer implemented method of claim 21, wherein the at least one service offering includes a price term.

25. The computer implemented method of method 21, wherein the collaborative workspace is accessible by only the buyer and the selected service provider.

26. The computer implemented method of claim 21, wherein both the buyer and the selected service provider rate each other.

27. The computer implemented method of claim 21, wherein the collaborative workspace includes:
   one or more communication tools;
   a file structure;
   one or more workbenches; and
   one or more project management tools.

28. A computer implemented method comprising:
   accepting a posting on a website of a project that a buyer wants completed, wherein the buyer identifies an industry specific category;
   accepting registration of service providers, wherein the service providers identify at least one industry specific category they will serve;
   maintaining a database of registered service providers;
   receiving a qualified bid on the project at least from a selected service provider, whose at least one indicated category matches the buyer's identified category;
   the buyer choosing the selected service provider from among one or more of the qualified bids; and
   providing the buyer and the selected service provider a collaborative workspace created for the project, wherein the collaborative workspace is configured to allow at least one of the buyer and the selected service provider to access the collaborative workspace after exiting the collaborative workspace.

29. A computer implemented method comprising:
   accepting registration of service providers, wherein the service providers identify at least one industry specific category they will serve;
   maintaining a database of registered service providers;
   accepting on a website a posting of at least one service offering at least by a selected service provider who is registered;
   providing a database containing posted service offerings;
   the website receiving at least one requirement for a project from a buyer, including the requirement that the selected service provider will serve an industry specific category;
   the website returning an optimized list of service offerings to the buyer in accordance with the at least one requirement for the project;
   transmitting a purchase request for the service offering from the buyer to the selected service provider; and
   providing the buyer and the selected service provider a collaborative workspace created for the project, wherein the collaborative workspace is configured to allow at least one of the buyer and the selected service provider to access the collaborative workspace after exiting the collaborative workspace.

30. A computer implemented method comprising:
   accepting registration of service providers, wherein the service providers identify at least one industry specific category they will serve;
   maintaining a database of registered service providers;
   accepting on a website a posting of at least one service offering for a project at least by a selected service provider;
   providing a database containing posted service offerings;
   viewing by a buyer of service offerings posted by service providers;
   transmitting a purchase request for the at least one service offering from the buyer to the selected service provider; and
   providing the buyer and the selected service provider a collaborative workspace created for the project, wherein the collaborative workspace is configured to allow at least one of the buyer and the selected service provider to access the collaborative workspace after exiting the collaborative workspace.

* * * * *